(12) United States Patent
Keller et al.

(10) Patent No.: US 8,840,314 B2
(45) Date of Patent: Sep. 23, 2014

(54) METHOD FOR PRODUCING A FLANGED DISK FOR A SPHERICAL ROLLER BEARING AND A SPHERICAL ROLLER BEARING HAVING A FLANGED DISK PRODUCED ACCORDING TO THE METHOD

(71) Applicant: Schaeffler Technologies AG & Co. KG, Herzogenaurach (DE)

(72) Inventors: Torsten Keller, Hessdorf (DE); Juergen Biedenbach, Nuremberg (DE); Manfred Gessner, Schweinfurt (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 14/055,255

(22) Filed: Oct. 16, 2013

(65) Prior Publication Data

US 2014/0037241 A1   Feb. 6, 2014

Related U.S. Application Data

(62) Division of application No. 13/389,074, filed as application No. PCT/DE2010/000903 on Jul. 29, 2010, now Pat. No. 8,591,119.

(30) Foreign Application Priority Data

Aug. 6, 2009 (DE) .......................... 10 2009 036 347

(51) Int. Cl.
*F16C 19/40* (2006.01)
*F16C 33/372* (2006.01)
*F16C 33/37* (2006.01)
*F16C 19/28* (2006.01)
*F16C 23/08* (2006.01)

(52) U.S. Cl.
CPC ................. *F16C 19/28* (2013.01); *F16C 33/37* (2013.01); *F16C 23/086* (2013.01)
USPC ......................................................... 384/551

(58) Field of Classification Search
USPC ......... 384/520–522, 535, 551, 558, 568, 572, 384/574–579; 29/898.061, 898.064, 29/898.065, 898.067
See application file for complete search history.

(56) References Cited

U.S. PATENT DOCUMENTS 837,830 A * 12/1906 Heinkel et al. ................. 384/551
6,152,606 A * 11/2000 Shirosaki et al. ............. 384/558

FOREIGN PATENT DOCUMENTS

| CN | 2071522 U | 2/1991 |
| DE | 29 04 368 A1 | 8/1979 |
| DE | 198 17 192 A1 | 10/1998 |
| DE | 10 2006 042 675 A1 | 3/2008 |
| GB | 101 021 A | 9/1917 |
| JP | 55 152819 U | 11/1980 |
| JP | 2001082467 A | 3/2001 |

* cited by examiner

*Primary Examiner* — Phillip A Johnson
(74) *Attorney, Agent, or Firm* — Davidson, Davidson & Kappel, LLC

(57) ABSTRACT

A spherical roller bearing having a flanged disk designed as a hollow body, formed from a straight pipe section that is bent to form a ring having two ring ends that are joined. The ring is shaped into a flanged disk with a desired axial section geometry in a pressing device with a contour tool in a single pass.

9 Claims, 2 Drawing Sheets

METHOD FOR PRODUCING A FLANGED DISK FOR A SPHERICAL ROLLER BEARING AND A SPHERICAL ROLLER BEARING HAVING A FLANGED DISK PRODUCED ACCORDING TO THE METHOD

CROSS-REFERENCE TO RELATED APPLICATIONS

This application is Divisional Application of U.S. Ser. No. 13/389,074 filed Feb. 6, 2012, which was a 371 of PCT/DE2010/000903 filed Jul. 29, 2010, which in turn claims the priority of DE 10 2009 036 347.5 filed Aug. 6, 2009. The priority of these three applications is hereby claimed and these three applications are incorporated by reference herein.

FIELD OF THE INVENTION

The invention relates a method for producing a flanged disk for a spherical roller bearing. Furthermore, the invention relates to a spherical roller bearing with an outer ring, an inner ring and a multiplicity of rollers arranged in at least two rows that are separated from one another by at least one ring-shaped flanged disk.

BACKGROUND OF THE INVENTION

A multiplicity of different embodiments of spherical roller bearings is known from the prior art. In contrast to normal ball bearings, spherical roller bearings make it possible to compensate relative movements and also to have an axial offset between two shafts. During the compensating action, however, the rolling bodies are deflected out of their ideal path, and this may lead to a wobbling movement. In order to prevent this undesirable movement sequence in the case of multiple-row spherical roller bearings, the rolling bodies are aligned with one another on the end faces by means of what is known as a flanged disk which is arranged between the roller rows.

Since a broad spectrum of the most diverse possible applications in mechanical engineering is covered by spherical roller bearings, such flanged disks have to be produced in a wide range of variation in terms of their dimensions and also in large quantities. The flanged disks are nowadays generally produced from portions of comparatively thick-walled tubes, these portions subsequently being machined further by cutting. However, this procedure is not practicable if the flanged disks required have special dimensional ratios, and therefore, in individual cases, solid round material has to be resorted to as initial material. Use of solid round material necessitates considerable scrap or waste, however, along with a high outlay in terms of manufacturing and cost. Furthermore, flanged disks made from solid material increase the weight of the spherical roller bearing thereby formed.

A two-row spherical roller bearing is known from DE 29 04 368. In this spherical roller bearing, the two rolling body rows are separated from one another by means of a loose guide ring. However, the guide ring is produced from a solid material, and therefore the abovementioned disadvantages of the prior art also apply to this embodiment.

SUMMARY OF THE INVENTION

The invention is directed to an improved method for producing a flanged disk for a spherical roller bearing, which permits simple manufacture, while at the same time reduces the scrap of the initial material, and allows for the production of weight-optimized flanged disks which in turn results in a reduction in the mass of the bearings equipped with them. Moreover, the invention is directed to a spherical roller bearing, which has a flanged disk improved in this way.

The method of the present invention broadly comprises bending an initially straight pipe portion into a ring having two ring ends separated by a gap. Two ring ends are then joined together thermally, and the closed ring is subsequently shaped into a flanged disk, which has an axial sectional geometry deviating from the circular shape. The method gives rise to negligibly low scrap from the initial material used. Apart from this, the cost-intensive cutting process necessary hitherto is dispensed with. Furthermore, the flanged disk, produced as a hollow body according to the method, has a significantly reduced weight, as compared with solid flanged disks with the same dimensions, thus opening up completely new areas of application. Moreover, a broad spectrum of flanged disks for the most diverse spherical roller bearing applications can be produced with a limited stock of tubes having standard dimensions.

The initial material for the method according to the invention is therefore an initially straight tube portion which, in a first method step, is bent or shaped into a ring having two ring ends separated by a narrow gap. The requisite length of the tube portion first to be cut to length from the initial tube depends on the required dimensions of the flanged disk to be produced from it by shaping. During this first shaping process, the original annular cross-sectional geometry of the tube portion is initially still approximately preserved. To prepare for a subsequent welding process, it may be necessary, in particular, to subject the two ring ends to mechanical retreatment, such as, for example, cut to length and/or lathe turning.

In a second method step, the ring ends are connected to one another to form a ring closed on itself which, in a third method step, is shaped into a flanged disk having an axial sectional geometry deviating from the circular shape. This second shaping process preferably takes place in a single pass in a press, using the shaping or contouring tools required for achieving a desired cross-sectional geometry. The ring ends are preferably joined together by welding.

According to an advantageous development of the method, there is provision whereby the flanged disk is given by the shaping process an approximately trapezoidal axial sectional geometry in which a surface area formed radially on the inside is axially shorter than a surface area formed radially on the outside. The external configuration of the flanged disk provided according to the invention consequently corresponds essentially to the appearance of the flanged disks known already from the prior art, and therefore the flanged disk produced according to the method can be employed in the known spherical roller bearings without further structural changes.

In a further advantageous refinement of the method, at least one venting bore is introduced into the straight tube portion or into the ring. As a result, on the one hand, the welding gases occurring during the thermal joining process can escape in a depressurized manner. On the other hand, the subsequent shaping process in the pressing tool is facilitated, since any changes in volume as a result of the change in geometry carried out on the ring do not lead to pressure rises.

According to a further advantageous development of the method, there is provision whereby the straight tube portion has a wall thickness of between 1.0 mm and 3 mm before the shaping operation. Said dimensions of the tube portion ensure that the ring formed from the tube portion is shaped sufficiently easily, preferably in one pressing step, into the flanged disk having a desired cross-sectional geometry. Furthermore, the stated wall thicknesses of the tube portion enable the straight tube portion to be bent, essentially free of kinks, into the required ring preform having inside and outside diameters customary for flanged disks.

According to a development of the method, there is provision where an outside diameter of the straight tube portion lies between 15 mm and 30 mm.

As a result, flanged disks having the most frequently required circumferential lengths of the approximately trapezoidal cross-sectional geometry usually needed can be shaped out of the straight tube portion or the ring.

In a further beneficial refinement of the method, the two ring ends are joined together by means of electric resistant welding. This ensures that the butt weld seam required between the two ring ends is produced especially simply in terms of process engineering. It is also possible, however, to connect the two ring ends to one another by means of a common sealing plug which is pressed into the end-face cavities of the ring ends.

According to a further development of the method, there is provision whereby the thermally joined ring is shaped in a press, preferably in a single pass, by means of a contouring tool into a flanged disk having the desired cross-sectional geometry. As a result of the single-pass shaping process by means of a suitable contouring tool or pressing tool, the flanged disks can be manufactured by means of the method with short cycle times, with high dimensional accuracy and in large quantities, using standard automatic presses.

The invention therefore also relates to a spherical roller bearing with an outer ring, an inner ring, and a multiplicity of rollers, which have a convex tread, received between them in at least one roller cage. The rollers are arranged in at least two rows, and the at least two roller rows being separated from one another by at least one ring-shaped flanged disk. Contrary to the prior art, there is provision for the flanged disk to be a hollow body.

Since the flanged disk is a hollow body, the spherical roller bearing equipped with it has reduced mass, as compared with known solutions. Moreover, the flanged disk can be produced cost-effectively and in large quantities in an energy-efficient manner, while the scrap from the initial material used is minimized.

In an advantageous refinement of the spherical roller bearing, the hollow body has an approximately trapezoidal axial sectional geometry, in which a surface area formed radially on the inside is axially shorter than a surface area formed radially on the outside. As a result, the flanged disk according to the invention corresponds to the conventional cross-sectional geometry of known flanged disks, and therefore, as a rule, no modifications have to be carried out to the previous design of spherical roller bearings.

In further advantageous refinements, the hollow body has a wall thickness of less than 3.0 mm and at least one venting bore.

BRIEF DESCRIPTION OF THE DRAWINGS

The invention is explained in more detail below by means of the accompanying drawing in which.

DETAILED DESCRIPTION OF THE INVENTION

Figure 1:
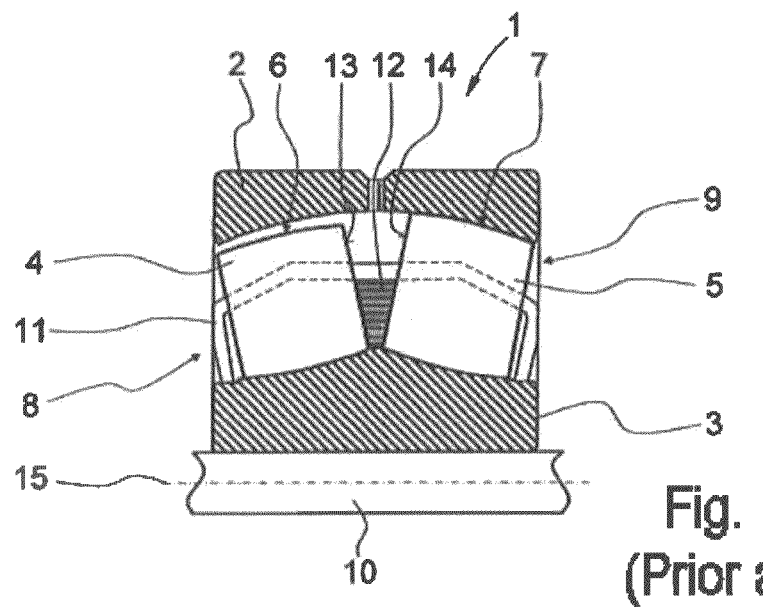
FIG. 1 shows an axial section through a spherical roller bearing having a flanged disk according to the prior art.

The same structural elements have in each case the same reference numeral in the drawing.

FIG. 1 accordingly shows a longitudinal section through an upper part of a two-row spherical roller bearing 1 with a flanged disk 12 in a known embodiment. The spherical roller bearing 1 comprises, inter alia, an outer ring 2 and an inner ring 3, between which rollers 4, 5 having in each case a convex tread 6, 7 are arranged in two rows 8, 9 running parallel to one another. The inner ring 3 of the spherical roller bearing 1 is mounted on a bearing shaft 10 indicated. The rollers 4, 5 are guided in at least one roller cage 11 which has a multiplicity of pockets, not illustrated in any more detail in the drawing, for receiving the rollers. Positioned between the two rows 8, 9 having the rollers 4, 5 is a flanged disk 12 with an approximately trapezoidal axial sectional geometry, to which planar roller end faces 13, 14 of the two rollers 4, 5 are adjacent on both sides, in order to prevent undesirable wobbling movements of the latter. Such wobbling movements arise, for example, when a longitudinal axis 15 of the bearing shaft 10, including the inner ring 3, is pivoted in relation to the outer ring 2 or, conversely, the outer ring 2 is pivoted in relation to the inner ring 3 and the bearing shaft 10. The flanged disk 12 is produced in a known way from a solid material, for example from a steel or high-grade steel alloy, and consequently has a relatively high weight.

Figure 2:
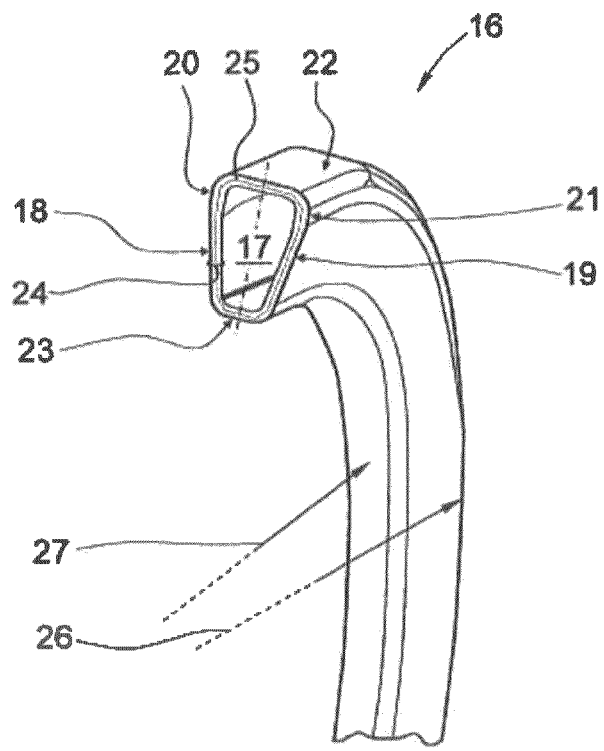
FIG. 2 shows a perspective illustration of a detail of a flanged disk designed according to the invention as a hollow body, with a view of its axial sectional geometry.

FIG. 2 shows a detail of a flanged disk produced by means of the method according to the invention. A flanged disk 16 is designed as a ring-shaped hollow body 17 closed on itself and having an approximately trapezoidal axial sectional geometry. The flanged disk 16 has, inter alia, two planar flanks 18 and 19 which run radially opposite to one another at a low inclination and which serve as bearing surfaces for end faces 13, 14, not illustrated in FIG. 2, of the rollers 4, 5 in a spherical roller bearing 1. Two parallel ring surfaces 20, 21 adjoin the two flanks 18, 19 radially on the outside and are connected to one another via to radially outer surface area 22. Lower ends, not designated, of the axial flanks 18, 19 are connected to a radially inner surface area 23 in each case via an oblique face. This radially inner surface area 23 serves for supporting the flanged disk 16 on the inner bearing ring 3 of the spherical roller bearing 1.

Figure 3:
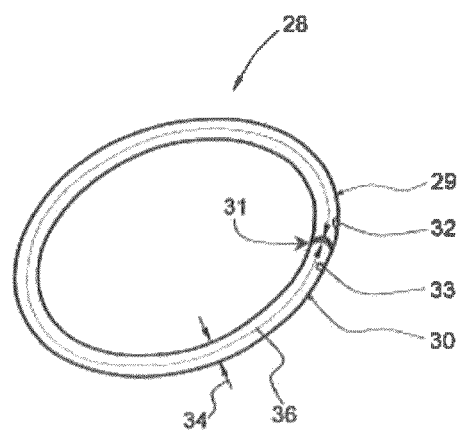
FIG. 3 shows a perspective view of an initially straight tube portion bent into a ring with free ends, as a ring preform.
Figure 4:
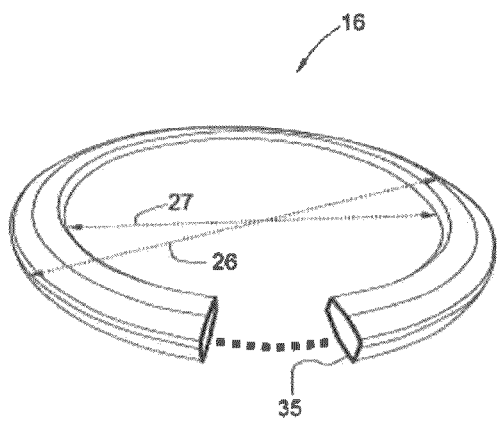
FIG. 4 shows a perspective illustration of the ring preform welded and shaped into the flanged disk.

The flanks 18 and 19, the two ring surfaces 20 and 21 and the surface areas 22 and 23 form an approximately trapezoidal axial sectional geometry of the flanged disk 16, said axial sectional geometry being closed on itself and being generated by means of a simple shaping process out of a tube portion bent into a ring and having an annular cross-sectional geometry (see FIGS. 3 and 4). In particular, transitions, not designated, between the flanks 18, 19 and the inner surface area 23 and transitions between the ring surfaces 20, 21 and the outer surface area 22 are not angular, but are preferably rounded, and are in this case designed with a radius of less than or equal to 1.0 mm.

The wall thickness 24 of the flanged disk 16 may vary in regions and preferably amounts to less than 3.0 mm. An approximate (mean) circumferential length 25 of the axial sectional geometry of the flanged disk 16 is composed, depending on the shaping process, of the sum of the lengths of the two lateral flanks 18 and 19, of the ring surfaces 20 and 21 and of the inner and outer surface areas 22, 23, including the lengths, not designated in any more detail, of the transitions. The shaped-out flanged disk 16 has an outside diameter 26 and an inside diameter 27 which are adapted to the respective dimensions of the spherical roller bearing into which the flanged disk is to be integrated (see FIGS. 1 and 4).

The method according to the invention for producing the flanged disk according to FIG. 2 will be explained in more detail by means of FIGS. 3 and 4 to which reference is made as the description proceeds.

The starting point of the method is a straight tube portion, not illustrated, which, in a first method step, as indicated by way of example in FIG. 3, is shaped into an approximately circular, that is to say essentially toroidal ring 28 having an annular cross-sectional geometry. The tube portion is a portion of any length of a tube having standard dimensions. Between the two ring ends 29, 30, a narrow gap 31 occurs due to an unavoidable springback effect after cutting to length and bending round. In the region of the gap 31, the two ring ends 29, 30 are joined together in a second method step, preferably by means of an electric resistance welding, so as to provide a butt weld seam, not illustrated. Alternatively to this, the two ring ends 29, 30 may also be joined together by means of other suitable thermal joining methods, for example by laser welding or the like.

Before thermal joining, it is usually necessary to subject the region of the ring ends 29, 30 to mechanical retreatment, for example by detaching a short piece in the region of the two ring ends 29, 30 and/or by lathe-turning the ring ends 29, 30. Before the actual welding operation, at least two continuous cylindrical venting bores 32, 33 are introduced into the ring 28 by drilling or punching, preferably in the region of the ring ends 29, 30. On the one hand, these venting bores 32, 33 prevent excess pressure from occurring in the ring 28 as a result of the welding gases arising due to the thermal joining process. On the other hand, the venting bores 32, 33 during the subsequent process of shaping into the flanged disk 16, in which a change in volume of an inner space of the ring 28 generally also occurs, prevent the situation where excess pressure within the ring 28 arises. Before the shaping process, an outside diameter 34 of the tube portion lies in a range of between 15 mm and 30 mm, but may have dimensions deviating from this, depending on the structural requirements to be satisfied by the associated spherical roller bearing.

The final shaping of the welded ring preform 28 into the flanged disk 16 according to FIGS. 2 and 4 takes place in a third method step in a press, not illustrated in the drawing, using corresponding contouring tools or shaping tools, preferably in a single step. As is clear from FIG. 4, an axial sectional geometry 35 of the flanged disk 16 produced has an approximately trapezoidal configuration, as regards the details of which reference is made to the explanations already given in the description of FIG. 2. The venting bores 32, 33 may, if necessary, be hermetically closed or sealed again after the end of the production process.

The outside and the inside diameter 26, 27 of the shaped-out flanged disk 16 correspond in each case to the structurally demanded dimensional stipulations of the spherical roller bearing into which the flanged disk 16 is to be inserted. Both the outside diameter 26 and the inside diameter 27 of the flanged disk 16 are in this case dependent on a length 36 of the ring 28 or of the initially straight tube portion, on its outside diameter 34 and on the type and degree of the shaping process employed in the individual case. Said dimensions therefore have to be predetermined, with reference to the shaping process, by means of suitable numerical simulation processes, so that the cross-sectional geometry 35 of the flanged disk 16 to be shaped out and its outside and inside diameters 26, 27 conform exactly structurally to the stipulated boundary conditions of the spherical roller bearing.

LIST OF REFERENCE SYMBOLS

1 Spherical Roller Bearing
2 Outer Ring
3 Inner Ring
4 Roller
5 Roller
6 Tread of the Roller
7 Tread of the Roller
8 Row with Rollers
9 Row with Rollers
10 Bearing Shaft
11 Roller Cage
12 Flanged Disk
13 Roller End Face
14 Roller End Face
15 Longitudinal Axis, Bearing Shaft
16 Flanged Disk
17 Hollow Body
18 Flank
19 Flank
20 Ring Surface
21 Ring Surface
22 Outer Surface Area
23 Inner Surface Area
24 Wall Thickness
25 Circumferential Length
26 Outside Diameter of the Flanged Disk
27 Inside Diameter of the Flanged Disk
28 Ring Preform
29 Ring End
30 Ring End
31 Gap
32 Venting Bore
33 Venting Bore
34 Outside Diameter of the Ring 28
35 Cross-Sectional Geometry (approximately trapezoidal)
36 Length (straight tube portion or ring)

The invention claimed is:

1. A spherical roller bearing, comprising:
an outer ring;
an inner ring;
at least one roller cage;
a plurality of rollers, which have a convex rolling contour, arranged between the outer ring and the inner ring in the roller cage in at least two rows; and
at least one ring-shaped flanged disk arranged to separate the two rows of rollers from each other,
wherein the flanged disk is a hollow body including a curved tube portion having an axial cross-section completely surrounding a hollow space.

2. The spherical roller bearing as claimed in claim 1, wherein the hollow body has a substantially trapezoidal axial cross-section such that a surface area formed radially on an inside of the hollow body is axially shorter than a surface area formed radially on an outside of the hollow body.

3. The spherical roller bearing as claimed in claim 1, wherein the hollow body has a wall thickness of less than 3.0 mm.

4. The spherical roller bearing as claimed in claim 1, wherein the hollow body has at least one venting bore.

5. The spherical roller bearing as claimed in claim 1, wherein the axial cross-section of the tube portion is substantially trapezoidal and completely surrounds a substantially trapezoidal axial cross-section of the hollow space.

6. The spherical roller bearing as claimed in claim 5, wherein tube portion includes two planar flanks running radially opposite to one another serving as bearing surfaces for end faces of the rollers, the tube portion further including a radially outer surface area and a radially inner surface area, the hollow space being formed between and inside of the two planar flanks, the radially outer surface area and the radially inner surface area.

7. The spherical roller bearing as claimed in claim 6, wherein the radially inner surface area supports the flanged disk on the inner ring.

8. The spherical roller bearing as claimed in claim 7, wherein the radially outer surface area supports the flanged disk on the outer ring.

9. The spherical roller bearing as claimed in claim 6, wherein the two planar flanks, the radially outer surface area and the radially inner surface area are connected to each other by rounded transitions.

* * * * *